Jan. 5, 1965  C. R. ANDERSSON  3,164,444
APPARATUS FOR COUNTERCURRENT LIQUID-LIQUID CONTACTING
Filed Feb. 21, 1961
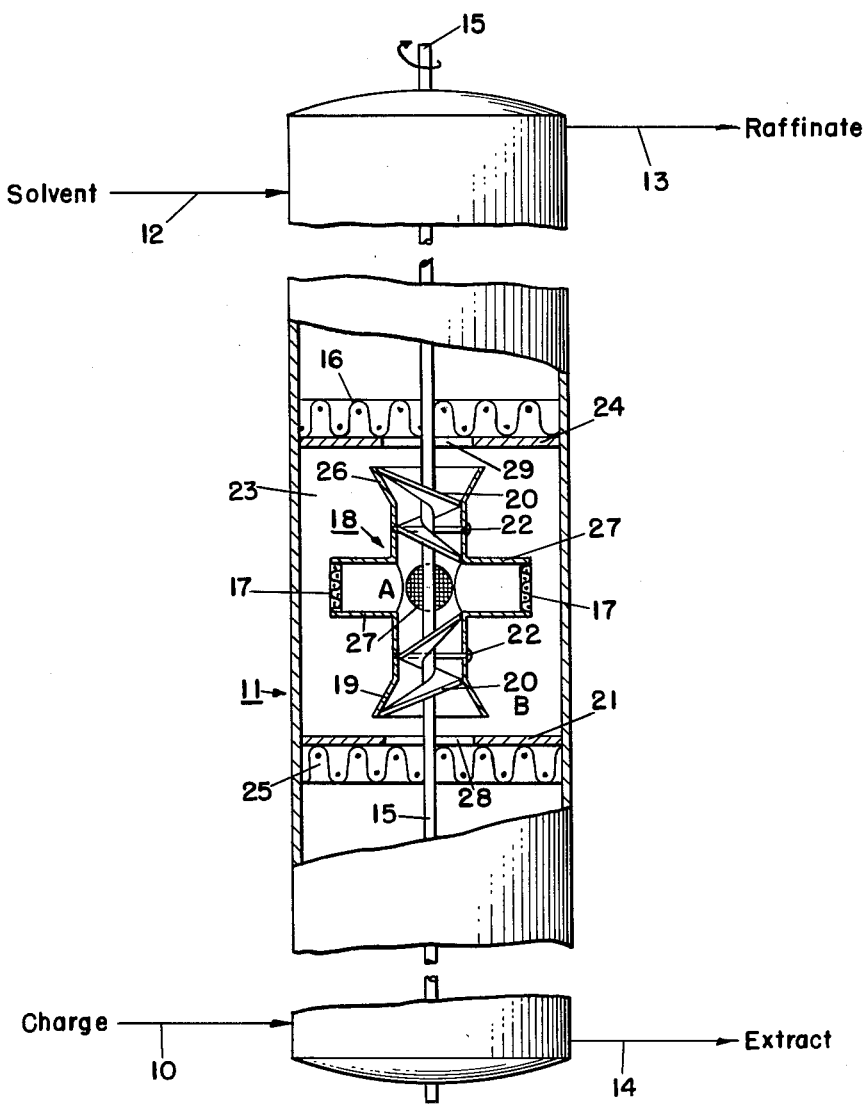
INVENTOR.
CRAIG R. ANDERSSON
ATTORNEY United States Patent Office 3,164,444
Patented Jan. 5, 1965

3,164,444
APPARATUS FOR COUNTERCURRENT
LIQUID-LIQUID CONTACTING
Craig R. Andersson, Swarthmore, Pa., assignor to Sun
Oil Company, Philadelphia, Pa., a corporation of New
Jersey
Filed Feb. 21, 1961, Ser. No. 90,834
3 Claims. (Cl. 23—270.5)

This invention relates to an apparatus for contacting at least partially immiscible liquids having relatively different densities. It particularly relates to a countercurrent contacting apparatus comprising a plurality of contact zones containing a rotating cross-piece wherein intimate admixing of the liquids occurs.

The invention is especially applicable to solvent extraction processes such as treating a hydrocarbon oil with furfural or aqueous phenol in order to selectively extract aromatic components from the oil. Other applications include the chemical refining of hydrocarbons, such as the treatment of hydrocarbons with reagents like sulfuric acid, hydrofluoric acid, aqueous caustic solutions, aqueous copper salt solutions, and the like. In such processes, usually one liquid is flowed countercurrently to the other through a series of stages or contacting zones.

Various proposals have been made in the past for contacting immiscible liquids as in solvent extraction, treating processes, etc. These proposals invariably include efforts to increase the contact efficiency such as by using a packed column, a batch agitated kettle system, columns equipped with slowly rotating diaphragms, wire gauze dividers, rotating discs, rotating agitators, and the like. Generally speaking, these techniques for liquid-liquid contacting have not been entirely satisfactory for a variety of reasons such as inadequate mixing, prohibitive expense, complicated design, low throughput, formation of stable emulsions or dispersions which do not readily separate, etc.

It is the object of this invention to provide an apparatus for contacting at least partially immiscible liquids having relatively different densities. It is a further object to provide a method and apparatus which accomplishes better contacting. It is another object to provide a rotating-type apparatus which accomplishes better contacting and higher throughputs while using less power consumption. It is still another object to provide a rotating-type apparatus which gives better contacting and higher throughputs while avoiding the production of stable emulsions. Numerous other objects will fully hereinafter appear.

In the accompanying drawing, FIGURE 1 is a diagrammatic illustration of one embodiment of the present invention.

The present invention has both method and apparatus aspects. The invention embraces a method of intimately contacting liquids of relatively different densities and which are at least partially immiscible with each other. The contacting is effected in a vertical column wherein the liquids are flowed progressively in opposite directions through a plurality of vertically superposed contact zones, each of the zones being defined by upper and lower perforate baffle plates extending inwardly from the inner wall or side of the column. Each zone is provided with a rotatable cross-piece comprising vertically disposed upper and lower inflow channels having ends positioned adjacent to and concentrically with openings in said baffle plate openings, and horizontally disposed outflow channels positioned between said ends. This method preferably comprises the steps of rotating the cross-piece, feeding the relatively less dense liquid into the bottom portion of the column and causing same to flow upwardly through the lowermost baffle plate opening into the lower inflow channel of the cross-piece, feeding the relatively more dense liquid into the top portion of the column and causing same to flow downwardly through the uppermost baffle plate opening into the upper inflow channel therein to intimately admix with the up-flowing liquid, causing the admixture to flow out the outflow channels, separating the relatively more dense liquid from the relatively less dense liquid, withdrawing the relatively more dense liquid from the bottom portion of the column, and withdrawing the relatively less dense liquid from the top portion of the column.

The invention also embraces an apparatus for effecting countercurrent liquid-liquid contacting which comprises, in combination, a vertical column having liquid inlets for said liquids near top and bottom, respectively; liquid outlets near top and bottom respectively; and perforate baffle means within the column defining at least one contacting zone. Each of the baffle means, e.g. plates, extends inwardly from the inner wall or side of the column and is perforated with one or more openings. Each zone, as above defined, has located therein a rotatable cross-piece comprising vertically disposed upper and lower inflow channels having ends positioned adjacent to and concentrically with the baffle plate openings, and horizontally disposed outflow channels positioned between said ends. The cross-piece is equipped with means for rotation about the centerline of the inflow channels.

Additional apparatus aspects include the above-described vertical column which contains additionally a coalescer comprising a layer of foraminate material having substantial thickness such as 1 to 5 inches positioned adjacent to each of the baffle plates and extending across the column so that the components of the admixture must flow therethrough prior to passage into the inflow channels of the cross-piece. In other words, above and below the contacting zones are layers of, say, fibrous packing, preferably of the self-supporting type as, for example, a disc of wire mesh. The packing essentially stops the circular motion of the liquids caused by the rotation of the cross-piece and hence aids in the separation of the more dense liquid and less dense liquid.

Still further apparatus aspects of the invention include the above-described vertical column with the rotatable cross-piece containing additionally in the horizontally disposed outflow channels concentrically disposed coalescer comprising a layer of foraminate material having substantial thickness such as 0.5 to 3 inches spaced intermediate the outflow channel ends and the centerline of the inflow channels. The foraminate material may be, for example, a wire mesh disc. The mesh discs provide a means for breaking up into fine droplets the dispersed phase and thus increases the mixing efficiency.

Other apparatus aspects include the above-described cross-piece wherein the vertically disposed inflow channels are tapered, e.g. flared or funnel-like. The taper runs outwardly toward the corresponding perforation in the adjacent baffle. These funnel-like ends of the inflow channels will insure that all of the flowing liquids from the upper and lower baffle plate opening will flow through the cross-piece.

Still other apparatus aspects of the present invention include the above-described cross-piece wherein the inflow channels, whether tapered or not, have attached thereto a helical support which spirals substantially the length of the channel. This so-called "screw" channel promotes rapid delivery of the intake liquid to the horizontal outflow channels. The screw channels also give rotational energy to the liquids and thereby promotes good mixing in the horizontal outflow channels.

These above-mentioned additional apparatus aspects may be used singularly or collectively in combination with the basic apparatus.

The term "cross-piece" as used herein includes a vertical channel piece which has interconnected therewith one or more horizontal outflow channel arms. Preferably, there are four outflow channel arms lying in the same plane horizontally with 90° between each other.

As used herein, the contact zones defined by the baffle plates may contain one or more cross-pieces. The baffle plates may contain a plurality of openings geometrically spaced around the centerline of the baffle. In the latter case, there is provided a cross-piece for every opening.

As used herein, the rotating means for the rotatable cross-piece can be of any type known to the art. Conventionally, each cross-piece is secured to a vertical shaft which extends throughout the length of the overall apparatus. The upper and lower ends of the shaft are conveniently mounted in suitable bearing members and the shaft is powered and rotated by any suitable power source such as an electric motor, a gas turbine, a reciprocating engine, or the like.

FIGURE 1 shows in partial cross-section a vertical column, tower, or chamber 11. Extending through the center of the column is a vertical rotatable shaft 15. The shaft is rotated by any suitable means such as a pulley drive connected to an electric motor (not shown).

The column is divided into any desired number of contact zones 23 one of which is illustrated in the drawing by the area between baffle plates 21 and 24. Each baffle plate contains a centrally disposed opening 28 and 29. Lying adjacent to and supported by baffle 24 is a wire mesh coalescer 16. Similarly, a wire mesh coalescer 25 is located adjacent to and below baffle 21.

Connected to shaft 15 by means of pins 22 is a rotatable cross-piece 18 comprising funnel-like inflow channels 19 and 26 having attached thereto a helical support 20, interconnected with horizontally disposed outflow channels 27 containing wire mesh discs 17.

In the apparatus shown, baffle plates 21 and 24 form one contacting zone. It will be understood that although the drawing shows the apparatus with only one zone, any desired number can be vertically superposed in the column, depending on the number of stages found most efficient for the operation contemplated. In solvent extraction, as illustrated, by employing the necessary number of contact zones, it is possible to extract essentially pure components in a single pass through the column. Ten to thirty zones can readily be built in a single column. Some processes, however, may require only one stage, e.g. a simple treating step; others may require as many as 50 or more contact zones.

As illustrative of the operation of the extracting apparatus, a mixture of light miscible liquids which it is desired to separate into its components is charged into column 11 through inlet 10. A heavy immiscible selective solvent for one of the components is admitted through line 12 into column 11. When light and heavy at least partially immiscible liquids are introduced into the column, they form relatively light or relatively less dense and relatively heavy or relatively more dense liquid phases, consisting predominantly of the light and heavy initial liquids, respectively, but one or both of these phases contains some solute dissolved out from the other liquid.

In countercurrent extractions, it has been found desirable that the liquid phases have a minimum density difference of 0.01 gram per cubic centimeter, preferably at least 0.08 gram per cubic centimeter, to permit countercurrent flow by gravity at reasonable throughputs.

The relatively less dense liquid phase flows upwardly through packing 25 and baffle opening 28 into lower funnel-like inflow channel 19. The relatively more dense liquid phase flows downwardly through packing 16 and baffle opening 29 into upper funnel-like inflow channel 26. The helical support 20 imparts rotational energy to both liquids so that intimate mixing occurs in zone A. The centrifugal force generated by the rotation of cross-piece 18 forces the admixture out through the horizontal outflow channels 27. The dispersed phase is broken up into fine droplets as it passes through wire mesh discs 17. The relatively more dense phase separates from the relatively less dense phase in zone B and passes downwardly through lowermost baffle plate opening 28. The less dense phase passes out of zone B through uppermost baffle plate opening 29.

The layers of packing 16 and 25 stop the circular motion of the fluids. The more dense liquid flows downwardly countercurrently to and through the rising stream of relatively less dense liquid. Similarly, the less dense phase flows upwardly countercurrently to and through the falling stream of relatively more dense liquid.

Thus, the heavier liquid solvent progresses downwardly through the series of contact zones extracting the, say, aromatic component from the upwardly flowing lighter liquid until the lighter liquid or raffinate phase leaves via line 13 and the solvent plus, say, aromatic component or extract phase leaves exit 14.

The operation of the present invention has been described, preferentially, as applicable to the solvent extraction of a hydrocarbon oil with the heavier solvent forming the dispersed extract phase. However, either the light or the heavy liquid may be the solvent, the other liquid being the liquid from which a component or components are extracted. Moreover, either the solvent or the liquid being extracted may form the continuous phase, the other forming the dispersed phase. Both liquids are usually fed into the contactor continuously but intermittent flow is also possible.

The speed of rotation of the cross-piece is preferably such that flooding of the column does not occur. The optimum speed of rotation of the cross-piece and the feed rate of liquids into the column are predetermined for each particular case, and are regulated accordingly for optimum results. In general, the rotational speed of the cross-piece will range from 1 to 100 revolutions per minute (r.p.m.). In some cases, however, rotational speeds up to 1000 r.p.m.'s may be used.

I claim:
1. An apparatus for countercurrently contacting liquids of relatively different densities comprising
(1) A vertical chamber with liquid inlets for said liquids near top and bottom, respectively, and liquid outlets near top and bottom, respectively,
(2) At least two separate, perforated, horizontally disposed baffles within said chamber, each of said baffles having a centrally disposed opening and extending inwardly from the walls of said chamber, which baffles define at least one contacting zone in said chamber,
(3) A vertical shaft passing through said chamber,
(4) A vertical cylindrical housing within said chamber and concentric with said shaft,
(5) Helices on said shaft within said housing in fixed relation thereto, with a central space between said helices, said helices being so disposed as to force liquid downwardly through the upper part of said housing and upwardly through the lower part of said housing,

(6) Horizontally disposed outflow channels communicating with said central space, and having openings at their outer ends, and
(7) Means for rotating said shaft about the axis thereof.

2. Apparatus according to claim 1 wherein said outflow channels contain a foraminate material.

3. Apparatus according to claim 1 wherein a layer of foraminate material is positioned within said chamber adjacent to each of said baffles and extending across said chamber.

References Cited in the file of this patent

UNITED STATES PATENTS 2,850,362    Scheibel ---------------- Sept. 2, 1958

FOREIGN PATENTS 585,517    Germany ---------------- Oct. 10, 1933

OTHER REFERENCES

German application 1,044,034, printed Nov. 20, 1958.